June 11, 1963   C. F. SPENCE   3,093,016
CHAIN SAW FILING GUIDE
Filed Oct. 20, 1961   2 Sheets-Sheet 1
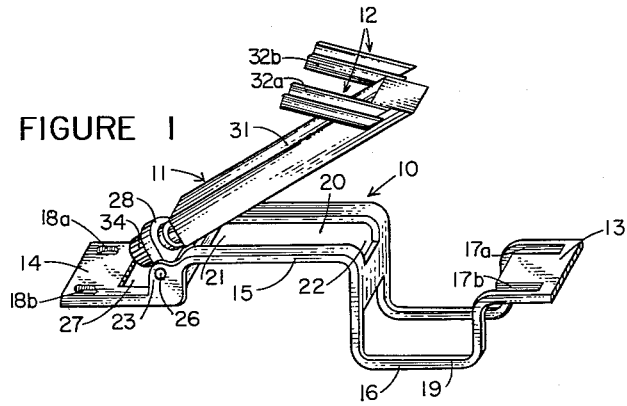
FIGURE 1
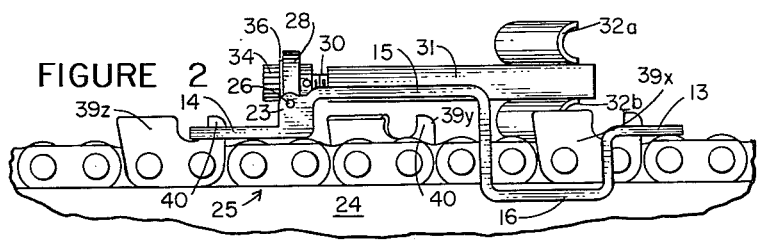
FIGURE 2
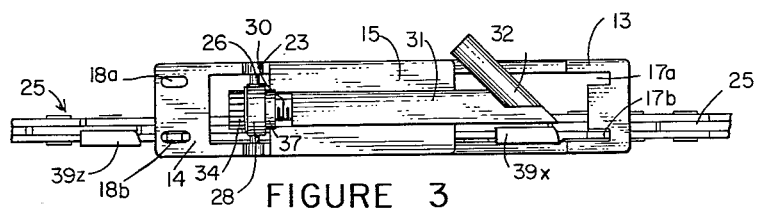
FIGURE 3
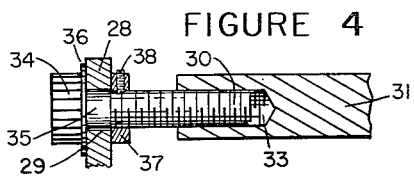
FIGURE 4
Clifton F. Spence, INVENTOR.
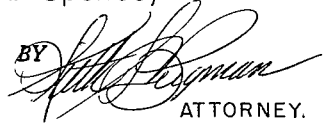
ATTORNEY.

June 11, 1963   C. F. SPENCE   3,093,016
CHAIN SAW FILING GUIDE
Filed Oct. 20, 1961   2 Sheets-Sheet 2
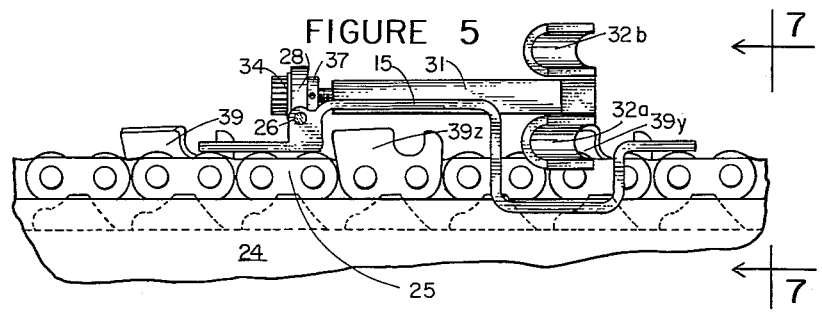
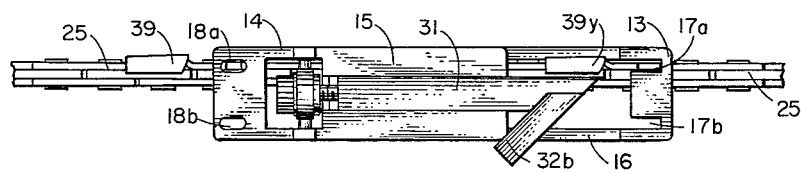
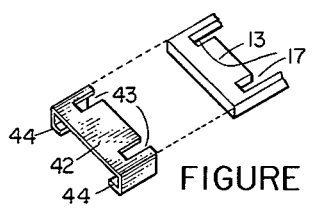
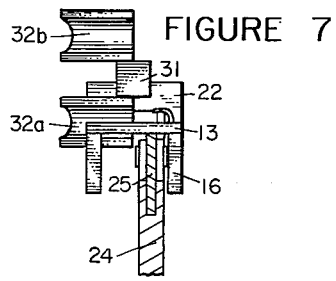
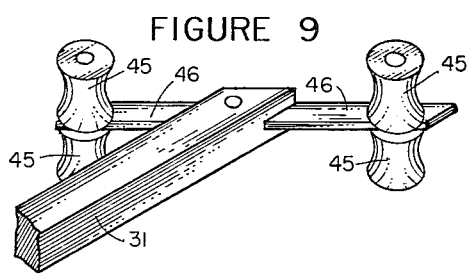
Clifton F. Spence, INVENTOR.
BY
ATTORNEY.

though they are used, referring to the accompanying drawings in more detail, and particularly to that of FIGURE 1, it will be seen that my invention consists essentially of a body portion 10, rotatably carrying a variably extending guide arm 11 which in turn carries the two similar file guides 12.

United States Patent Office 3,093,016
Patented June 11, 1963

3,093,016
CHAIN SAW FILING GUIDE
Clifton F. Spence, Kamiah, Idaho; Hilda M. Spence, administratrix of said Clifton F. Spence, deceased
Filed Oct. 20, 1961, Ser. No. 146,550
4 Claims. (Cl. 76—36)

This invention relates generally to a filing guide adapted to aid in sharpening and determining the proper physical shape of a saw tooth after filing, and more particularly, to such a device adapted for use with chain-saw chains.

The portable, mechanically operated chain saw of commerce has become a tool of major importance in the logging, lumber and construction industries throughout the world wherever it becomes necessary to cut trees, larger pieces of wood or wood products, or other materials having similar properties. Because of the peculiar shape and nature of the cutting teeth of these tools and their operation, it is critical to maintain the cutting teeth in a sharpened condition and in appropriate spacial relation and configuration to the other parts of the chain for proper operation of the saw. Because of this, the sharpening of a chain saw chain is frequently required, and in the past it has been a relatively time consuming and expensive task requiring the labors of a skilled workman.

The principal object of the instant invention is to provide a filing guide adapted to fit over and upon the cutting chain of a chain saw of commerce to guide a file for the proper sharpening of the cutting teeth of the chain.

A further object of the instant invention is to provide such a device of a small compact nature that may be readily carried in the pocket of a workman.

A further object of my invention is to provide a device of the nature aforesaid that may be readily converted to sharpen either right or left hand teeth.

A further object of my invention is to provide a device of the nature aforesaid that will sharpen all saw teeth to the same spacial configuration and shape.

Another object of my invention is to provide a device of the nature aforesaid that will uniformly sharpen the cutting teeth of a chain saw when used by either a right or left handed saw sharpener.

A still further object of my invention is to provide a device of the nature aforesaid that may be used to file the rakers of a chain saw chain in predetermined proper relation to the dimensions of the cutting teeth.

A still further object of my invention is to provide a device of the nature aforesaid that assists in prolonging chain life, providing for smoother operation thereof, more accurate cutting thereby, and is new and novel of design and of simple and economic manufacture.

Other advantages and objects of my present invention will be apparent from consideration of the following detailed description and specific embodiment thereof.

In the accompanying drawings which form a part of this specification and in which like numbers of reference refer to similar parts throughout:

FIGURE 1 is an isometric view of my saw sharpening guide, showing the general configuration of its various parts and their relation to each other.

FIGURE 2 is an orthographic side view taken on a vertical plane showing my invention in position on the chain of a saw ready to sharpen a left hand tooth.

FIGURE 3 is an orthographic view of the same thing as FIGURE 2, taken on a horizontal plane above the sharpening device.

FIGURE 4 is a partially cut-away enlargement of the extending-screw portion of my invention, showing the detailed construction thereof.

FIGURE 5 is an orthographic view of my sharpening device in position on a chain similar to that of FIGURE 2, but reversed to sharpen a right hand tooth.

FIGURE 6 is an orthographic view of the same thing as FIGURE 5, taken on a horizontal plane above the sharpening device.

FIGURE 7 is a cross-sectional view of FIGURE 5, taken on the vertical plane 7—7 in the direction indicated by the arrows thereon.

FIGURE 8 is an isometric view of a type of shim that may be used in connection with my invention to regulate the height of the chain rakers.

FIGURE 9 is an isometric view of a specie of file guide for my invention using movable rollers.

Referring now to the drawings in more detail, and particularly to that of FIGURE 1, it will be seen that my invention consists essentially of a body portion 10, rotatably carrying a variably extending guide arm 11 which in turn carries the two similar file guides 12.

The body 10 of my invention is constructed, essentially to the shape illustrated in FIGURE 1, from a flat, bandlike piece of metal. It has the forward raker platform 13 and the rearward raker platform 14 structurally united by the joining upward extending U shaped portion 15 and the downwardly extending U shaped portion 16. The forward raker platform 13 is provided with the raker slots 17 of such width as to allow a raker tooth 40 of a saw chain 25 to be supported therein, and of an appropriate length as hereinafter specified. The rearward raker platform 14 contains the elongate holes 18 adapted to allow a raker 40 to fit therein. The forward raker platform 13 and rearward raker platform 14 should be parallel with each other, both as to their lower and upper surfaces, and parallel with the axis of a chain blade when the device is in position on the chain 25 of a saw. The raker slots 17 and holes 18 should be so positioned that their axes fall on a parallel line with the longest axes of the body portion 10, and should be spaced so that when the raker 40 of one tooth 39 of a chain 25 is in position in the hole 18b, the raker 40e of the second tooth therefrom of a standard chain 25 will be supported within the slot 17b, as more particularly illustrated in FIGURES 2 and 3. This positioning is critical and will vary with the varying dimensions of the standard chains 25 of commerce.

The lowermost central portion of the downwardly extending U shaped body part 16 is removed leaving the side support members 19. The dimensions of this space left between the side support members 19 should be such as to allow my sharpener to fit over a saw chain 25, as illustrated in FIGURE 2, and yet should not be greater than necessary so that the entire filing guide will be reasonably well supported and prevented from tipping when in position on a saw chain 25 by reason of the side support members 19 nearly coming in contact with the saw blade 24 on each side thereof. The depth or downward projection of this downwardly U shaped portion 16 must also be such as to allow the side support members 19 to extend downwardly far enough, when a blade is so positioned, to fulfill this purpose.

A somewhat similar central portion 20 is removed from the uppermost portion of the upwardly extending U shaped body part 15 to allow the guide arm 11 to be seated therein. The width of this opening 20 must be slightly greater than the width of the guide arm 11 to accomplish this purpose. The rearward portion of this orifice 20 should be sufficiently low so as not to interfere with any rotary motion of the guide arm 11. The forward portion 22 of the orifice 20 should be so formed as to support the guide arm 11 in a horizontal position with its axes parallel with the line joining the axes of the raker slot 17 and hole 18, so that when the guide arm 11 is in the supported position illustrated in FIGURE 2 it will be substantially parallel with the raker platforms 14, 15 and therefore with the various parts of the saw chain 25.

The forward portion of the rearward raker platform 14 carries the two similar opposed upwardly extending ears 23 which support the cylindrical guide arm axle 26. Holes are provided in the ears 23 to allow the axle 26 free rotation therein.

An orifice 27 is provided in the rearward raker platform to allow free rotary motion of the guide arm 11 and its various parts, so that it may be turned about the guide arm axle 26 and thence about its longest axes.

The guide arm yoke 28 is shaped essentially as illustrated, with the guide arm axle 26 projecting therefrom into the supporting holes in the ears 23. The axle 26 must be non-rotatably connected to the yoke 28, or, preferably may be formed as an integral part thereof. The central portion of the yoke 28 is provided with the cylindrical hole 29 adapted to rotatably carry the extending screw 30.

The guide arm 11 comprises the elongate square body portion 31, carrying at its forward end the angularly positioned filing supports 32. The rearward portion of the body 21 is provided with the central axially aligned threaded hole 33, adapted to threadedly receive the extending screw 30. This extending screw 30 is a thumb screw of commerce having the knuried head 34 and a portion 35 immediately forward of the head 34 without threads, so that when the screw 30 is placed through the hole 29 of the yoke 28, it will be free to rotate therein. This rotation is aided by the washer 36 placed between the head 34 and the yoke 28. The screw 30 is held in place in the yoke by means of the threaded ring or round nut 37, prevented from rotatably moving on the screw 30 by means of the small set screw 38. From this arrangement of parts, it is seen that if the extending screw 30 be turned relative to the guide arm body 31, the body 31 will move axially with reference to the body portion 10 of my invention in a direction dependent upon the direction of rotation of the screw 30.

The similar opposed file supports 32 are of a size and half-cylindrical shape illustrated, adapted to support and direct a cylindrical file of commerce of appropriate predetermined size to file a particular saw chain 25. Each is positioned on the guide arm body 31, on the opposite side thereof, as illustrated, at an angle such that when my invention is in the position illustrated in FIGURE 2, the axes of a file (not shown) guided by the file supports will make an angle of substantially 35° with the axes of the saw chain 25. I prefer to join the file supports 32 to the body 31 by welding.

A modified form of file support using roller file guides 45 is shown in FIGURE 9. Here, pairs of guides 45 are rotatably carried by the same axle which is supported in turn by the crossarm 46, as illustrated. Each of the opposite ends of the crossarm 46 is provided with this type of guide, and the arm 46 is in turn rigidly carried by the forward portion of the guide body 31 in an angularly disposed fashion as hereinbefore described, so that a file supported thereby will make an angle of 35 degrees with the axis of a chain being sharpened. This specie of my invention wears better and creates less file abrasion than the primary form first described, but does not support a file so firmly.

The use of my invention on a left hand tooth 39x is best illustrated in the drawings of FIGURES 2 and 3. The saw chain 25 is first inspected to determine the shortest tooth 39x, or tooth that will be the shortest when properly filed. Assuming that this tooth be the left handed tooth 39x of FIGURE 2, my invention is placed, as illustrated, with the raker 40x in the slot 17b and the raker 40x of the second tooth rearward in the slot 18b. The guide arm has been positioned as illustrated and its length adjusted by appropriately turning the extending screw 30 until the file guides 12 are in a position to completely sharpen the tooth 39x. To sharpen the tooth 39x, a cylindrical file (not shown) of appropriate size for the tooth 39x in question is inserted within the file guide 12b, and moved against the tooth 39x until, when the file is supported by the guide 12b, no more metal will be removed from the tooth 39x. Keeping the same extension setting and the same positioning of the file arm 11, the device is then advanced to sharpen the next left hand tooth 39x in a similar fashion, and so on until all teeth are sharp. To insure uniformity in sharpening action, I have found that it is preferable to move the chain 25 rather than to have the filer move into position for each tooth 39, so that the filer will be in substantially the same position relative to each tooth filed.

When the sharpening of all of the left hand teeth 39x has been accomplished the device is moved with the same setting of the extension screw 30, to the position illustrated in FIGURES 5 and 6. To accomplish this, the guide arm 11 is rotated 180° about its longest axes, thus placing the file guide 12a into position for sharpening of the saw tooth 39y. The right handed teeth are then sharpened in a fashion similar to that described for the left handed teeth. Upon accomplishment of this the saw chain 25 is sharpened.

The relative height of the rakers 40 in relation to the height of the saw teeth 39 is also critical in a chain saw, as this regulates the depth of the cut and even the nature of cut as to whether it be an actual cut or a scrape. Since the outer surface 41 of the saw tooth 39 have a slight taper of some three odd degrees toward the rearward, the overall outward projection of the saw teeth 39 will be lessened as the teeth are sharpened and become shorter. To compensate for this, it often times is necessary to reduce the height or upward projection of the rakers 40. It often times is also necessary to change this height when different types of woods are being sawed.

To accomplish this purpose, I provide shims 42 of a nature illustrated in FIGURE 8 for use with my device. This shim 42 is formed to the shape illustrated from a relatively thin sheet material with slots 43 adapted to fit over the raker slots 17, 18 of my device and downwardly projecting ears 44, adapted to firmly support the shim 42 on either the forward raker 13 platform or rearward raker platform 14. These shims 42 are provided in varying thickness, preferably having a difference of about $5/100$ of an inch in thickness for each.

To file the rakers 40 of a saw chain 25, a shim 42 of appropriate thickness is chosen so that the top of the shim 42 will just be at the right height for the raker 40 in question. This appropriate shim 42 is installed on the rearward raker platform or forward raker platform 13, or both, as desired, and the raker 40 projecting above the shim 42 is filed off. My device is then moved to the next raker 40 and the operation repeated until all rakers 40 of the chain 25 are of the uniform desired height.

It is to be noted from the foregoing description of my invention that when it is used to sharpen a saw chain 25, all saw teeth 39 will be of the same length, the same angle of cut, and of necessity the same height. All rakers will have the same height and the same difference between the height of raker and the height of saw teeth will be constant.

I prefer to construct the various parts of my invention from tool steel of a reasonably hard nature, although other materials will probably function under these teachings. The file guides 12 must be of a very hard nature to withstand, over any extended period, the natural action of the files which they guide.

While a specific embodiment of my invention has been disclosed in the foregoing specification, it should be understood that the specific terminology and structure are not intended to be restrictive or confining, and that various rearrangements of parts, modifications of detail, and substitutions of materials may be resorted to without departing from the essence, scope or spirit of the invention herein disclosed and hereinafter claimed.

Having thusly described my invention, what I desire to protect by Letters Patent, and, what I claim is:

1. A saw filing guide for use in sharpening a chain saw of commerce, as aforesaid, comprising, in combination, a body member having a forwardly extending, flat, planar raker platform and a similar rearwardly extending, flat, planar raker platform substantially parallel therewith, each being provided with slots so arranged and spaced as to fit over the raker arms of the teeth of a chain saw of commerce, each adjacent to a common tooth, respectively, each of said platforms being connected by a downwardly extending U shaped member having the central portion thereof removed to allow it to be positioned over the blade and chain of a chain saw of commerce to be supported by said blade and an upwardly extending U shaped portion having the central part thereof removed, being adapted to receive a substantially square guide arm and support said arm with its longest axis parallel to the plane of aforesaid raker platforms, and at a predetermined height thereabove; and a guide arm extensively and rotatably carried by a yoke rotatably supported by said body, said guide arm having two paired, opposed file guides, angularly carried on the forward portion thereof so disposed that when said device is positioned upon the chain of a saw of commerce, as aforesaid, a file aligned properly with said file guide will sharpen the tooth of said saw.

2. The device of claim 1 wherein said guide arm is rotatable about its axis 180° to sharpen both right and left hand teeth of a saw.

3. The device of claim 1 with shims adapted to fit over said raker platforms to vary the height thereof to properly shape said rakers.

4. A chain saw filing guide of the nature aforesaid comprising, in combination, a body member having openings therein adapted to fit over and allow said member to rest upon the chain of a saw; an elongate guide arm rotatably and extensively carried by said body, releasably supported thereby in a position substantially parallel with said saw chain; means of adjustably moving said guide arm along its longer axes to predetermined positions; and paired file guides carried thereby on opposite sides thereof, shaped to receive a cylindrical file of commerce and support said file in a horizontal angular position relative to said saw chain, adapted to properly sharpen the saw teeth thereof, said guide being rotatable 180 degrees about its longer axis to sharpen both right and left hand saw teeth, comprising a cross-piece carrying paired opposed axially coincident rollers at the ends thereof, having a surface shape adapted to receive said cylindrical file and appropriately support it when positioned on each of two paired rollers at opposite ends of said cross-piece.

References Cited in the file of this patent

UNITED STATES PATENTS

| | | |
|---|---|---|
| 88,893 | Miller | Apr. 13, 1869 |
| 2,152,931 | Svensson | Apr. 4, 1939 |
| 2,818,752 | Granberg | Jan. 7, 1958 |
| 2,822,707 | Gommel | Feb. 11, 1958 |